United States Patent [19]

Minakawa et al.

[11] Patent Number: 4,734,786

[45] Date of Patent: Mar. 29, 1988

[54] IMAGE PROCESSING APPARATUS

[75] Inventors: Takashi Minakawa; Yasuhisa Ishizawa, both of Yokohama, Japan

[73] Assignee: Canon Kabushiki Kaisha, Tokyo, Japan

[21] Appl. No.: 660,924

[22] Filed: Oct. 15, 1984

[30] Foreign Application Priority Data

Oct. 17, 1983 [JP] Japan ................... 58-193876

[51] Int. Cl.⁴ ............................................. H04N 1/04
[52] U.S. Cl. .................................... 358/287; 358/283
[58] Field of Search .................. 358/283, 287; 382/47

[56] References Cited

U.S. PATENT DOCUMENTS 4,394,693 7/1983 Shirley ............................... 358/283

OTHER PUBLICATIONS

IEEE Transaction on Communications, vol. COM-29, No. 12, (Dec. 1981), pp. 1898–1925 (Stoffel et al.).

Primary Examiner—Edward L. Coles, Sr.
Attorney, Agent, or Firm—Fitzpatrick, Cella, Harper & Scinto

[57] ABSTRACT

An image processing apparatus comprises image data input means and processing means for processing the image data inputted from the input means. The processing means enlarges or reduces the image data by a unit of a predetermined area.

15 Claims, 21 Drawing Figures

FIG. 1    FIG. 2    FIG. 3
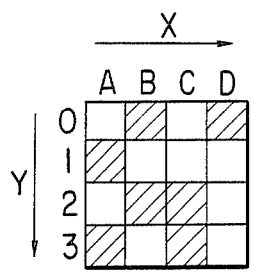
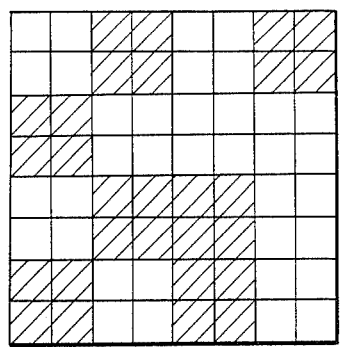
FIG. 4
| | | | A |
|---|---|---|---|
| 1 | 2 | 3 | 4 |
| 12 | 13 | 14 | 5 |
| 11 | 16 | 15 | 6 |
| 10 | 9 | 8 | 7 |
FIG. 5
| 1 | 1 | 2 | 2 | 3 | 3 | 4 | 4 |
|---|---|---|---|---|---|---|---|
| 1 | 1 | 2 | 2 | 3 | 3 | 4 | 4 |
| 12 | 12 | 13 | 13 | 14 | 14 | 5 | 5 |
| 12 | 12 | 13 | 13 | 14 | 14 | 5 | 5 |
| 11 | 11 | 16 | 16 | 15 | 15 | 6 | 6 |
| 11 | 11 | 16 | 16 | 15 | 15 | 6 | 6 |
| 10 | 10 | 9 | 9 | 8 | 8 | 7 | 7 |
| 10 | 10 | 9 | 9 | 8 | 8 | 7 | 7 |
FIG. 6
| A | | | | A | | | |
|---|---|---|---|---|---|---|---|
| 1 | 2 | 3 | 4 | 1 | 2 | | |
| 12 | 13 | 14 | 5 | 12 | 13 | | |
| 11 | 16 | 15 | 6 | | | | |
| 10 | 9 | 8 | 7 | | | | |
| 1 | 2 | | | 1 | 2 | | |
| 12 | 13 | | | 12 | 13 | | |
| | | | | | | | |
| A | | | | | | | A |
FIG. 7A
| A1 | A2 | A3 | A4 |
|---|---|---|---|
| A5 | A6 | A7 | A8 |
| A9 | A10 | A11 | A12 |
| A13 | A14 | A15 | A16 |
FIG. 7B
| A1 | A3 |
|---|---|
| A9 | A11 |

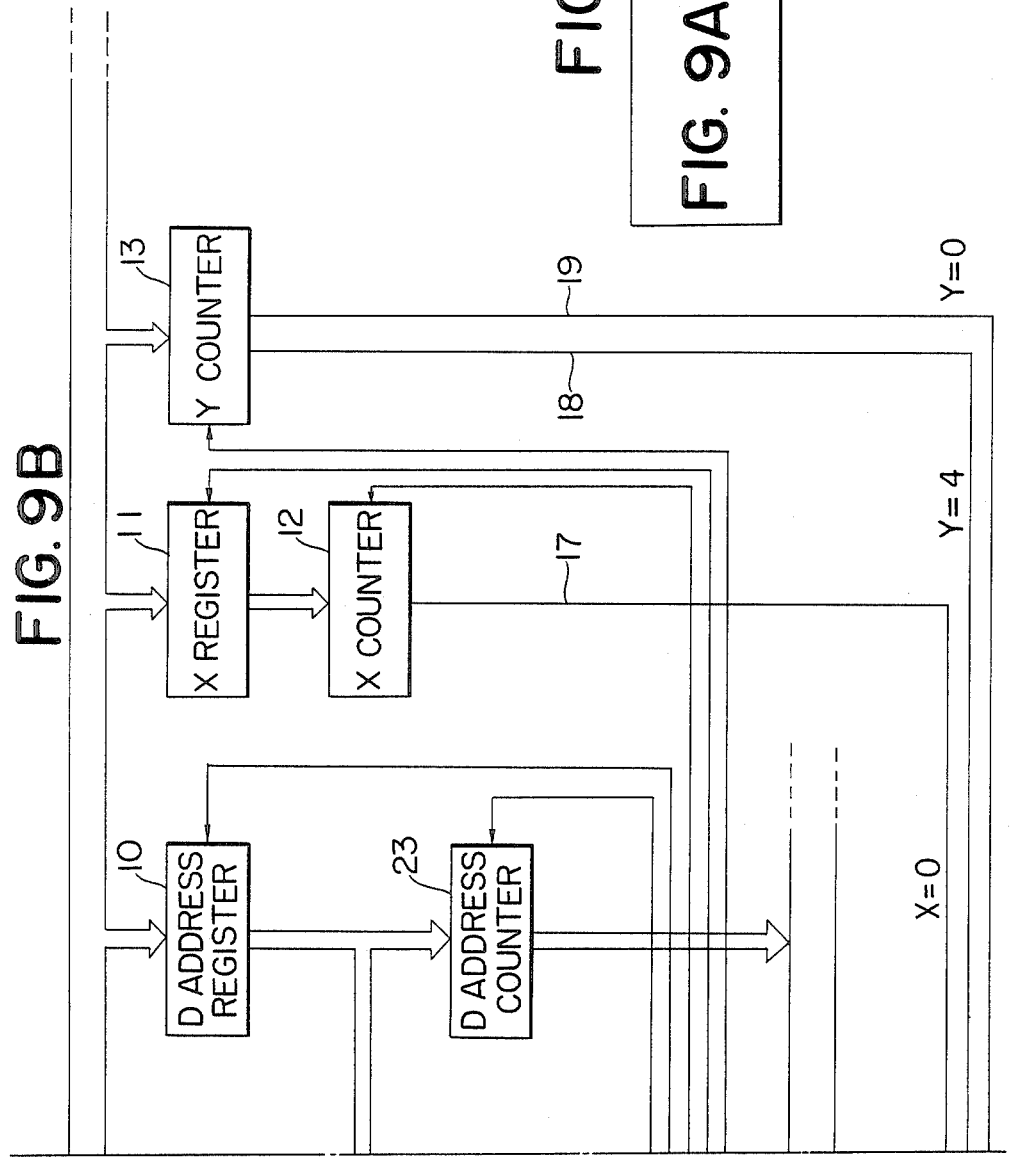

IMAGE PROCESSING APPARATUS

BACKGROUND OF THE INVENTION

1. Field of the Invention

The present invention relates to an image processing apparatus, and more particularly to an apparatus for enlarging and reducing an image.

2. Description of the Prior Art

Various methods for enlarging and reducing the image have been proposed. For example, by doubling each bit data of a 4×4 matrix shown in FIG. 1 in both vertical (Y) direction and horizontal (X) direction, an enlarged image as shown in FIG. 2 is produced. For reduction, bits at predetermined positions [(X, Y) =(A, 0), (C, 0), (A, 2), (C, 2)] of the 4×4 matrix shown in FIG. 1 are sampled to produce a reduced image as shown in FIG. 3.

When the above enlarging and reducing method is applied to a conventional image (for example, character image generated by a pattern generator), no serious problem occurs, but when it is applied to a ditherred image, an image quality of a reproduced image may be degraded.

For example, when an image of a given density is dithered by a dither matrix A shown in FIG. 4 (in which numerals indicate thresholds) and enlarged by a factor of two in both vertical and horizontal directions by the enlarging method described above, the enlarged image is same as a pattern obtained by ditherring by a dither matrix shown in FIG. 5. Thus, the reproducibility by the dither matrix A is lost. Since the dithered image has a periodicity due to the dither matrix, a large change may occur in the reproduced image depending on the sampling bit positions.

SUMMARY OF THE INVENTION

It is an object of the present invention to provide an improved image processing apparatus.

It is another object of the present invention to provide an image processing apparatus which produces a high quality reproduced image.

It is other object of the present invention to provide an image processing apparatus capable of enlarging and reducing an image.

It is other object of the present invention to provide an image processing apparatus having a high image data processing efficiency.

Other objects of the present invention will be apparent from the following description of the invention.

BRIEF DESCRIPTION OF THE DRAWINGS

FIG. 1 shows an original image,

FIG. 2 shows an enlarged image of the image shown in FIG. 1,

FIG. 3 shows a reduced image of the image shown in FIG. 1,

FIG. 4 shows a 4×4 dither matrix,

FIG. 5 shows an apparent dither matrix for an enlarged image of a ditherred image by a conventional enlarging method, FIG. 6 shows an enlarged image by the present invention, FIGS. 7A and 7B show reduced images by the present invention.

DETAILED DESCRIPTION OF THE PREFERRED EMBODIMENTS

FIG. 6 illustrates an enlarged image by the present invention. When a gray level image processed by the dither matrix A shown in FIG. 4 is enlarged by a factor of two in vertical and horizontal directions by the present invention, the bit data are arranged as shown in FIG. 6 where numerals represent thresholds of the dither matrix of FIG. 4.

A reduced image by the present invention is now explained with reference to FIGS. 7A and 7B. Fig. 7A shows a gray level image, for each matrix unit, processed by the dither matrix A shown in FIG. 4. It is represented by matrices A1 to A16 each of which represents the image processed by the dither matrix A.

FIG. 7B shows a reduced image of the image shown in FIG. 7A. As seen from FIG. 7B, the reduction is effected matrix by matrix (A1, A3, A9 and A11). Thus, in accordance with the present invention, the image is processed without destroying the pattern obtained by the dither processing so that the reproducibility by the dither matrix is not lost and a high quality of enlarged or reduced image is produced.

Figure 8:
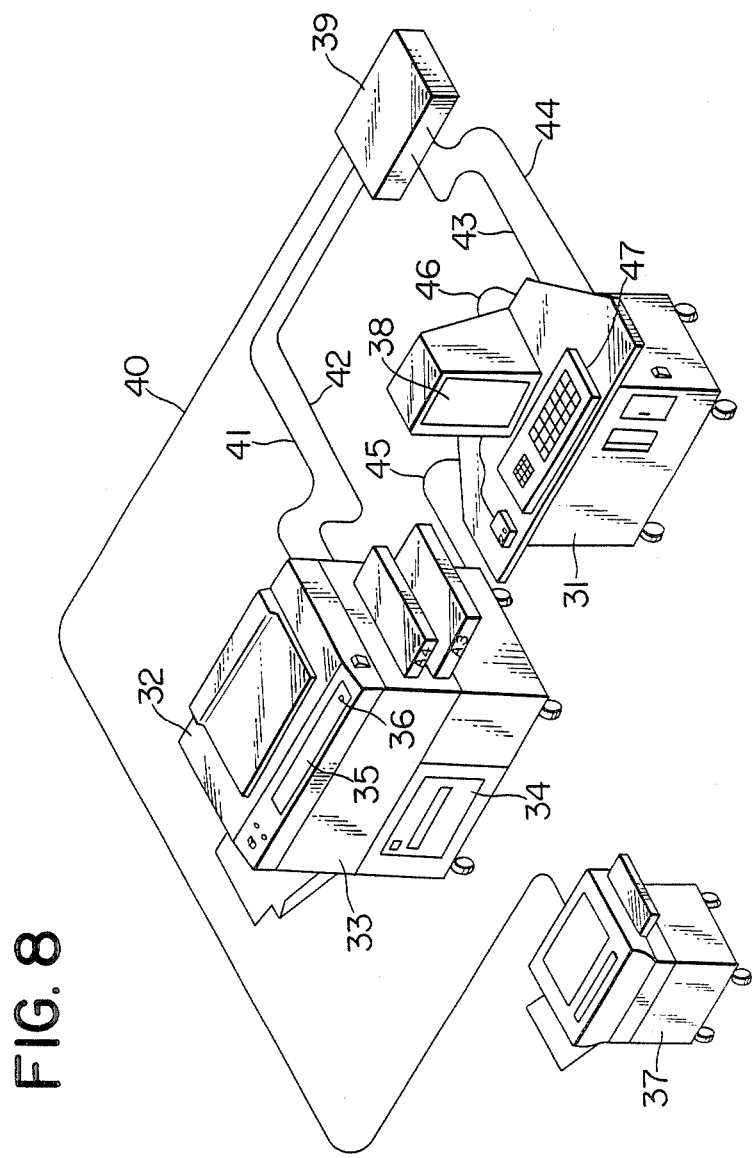
FIG. 8 shows a configuration of an image processing system used in the present invention, FIG. 9 composed of FIGS. 9A and 9B shows a control circuit in the present embodiment.

FIG. 8 shows a configuration of an image processing system in accordance with the present invention. Numeral 31 denotes a controller (workstation) having a system control microcomputer, an internal memory including a RAM and a ROM, and an external memory including a floppy disc or a cartridge disc. The controller includes a control circuit and a memory unit to be described later. Numeral 32 denotes an input unit of a digital copier. It is a text reader which converts document information of an original text mounted on a text table to an electrical signal by an imaging device such as CCD. Numeral 33 denotes an output unit of the digital copier. It is a high speed printer such as a laser beam printer for recording an image on a record medium in accordance with the electrical signal information. Numeral 34 denotes an image file having a storage medium such as an optical disc or an opto-magnetic disc and capable of reading and writing a volume of image information. Numeral 37 denotes a printer such as a laser beam printer, similar to the printer 33. It is smaller and of lower speed than the printer 33 and provided as required. Numeral 38 denotes a CRT display for displaying the image information optically read by the digital copier (reader) or the system control information. Numeral 39 denotes a switch for switching the connection of the input/output devices in accordance with signals from the controller 31. Numerals 40–46 denote cables for electrically connecting the input/output devices. Numeral 47 denotes a keyboard provided on the controller 31. By manipulating the keyboard 47, the system operation command, magnification display command for the CRT and other commands are issued. Numeral 35 denotes a console panel for controlling the operation of the digital copier. It has keys for setting the desired number of copies and magnification, a copy key 36 for commanding start of copy and a numeric display.

Figure 9A:
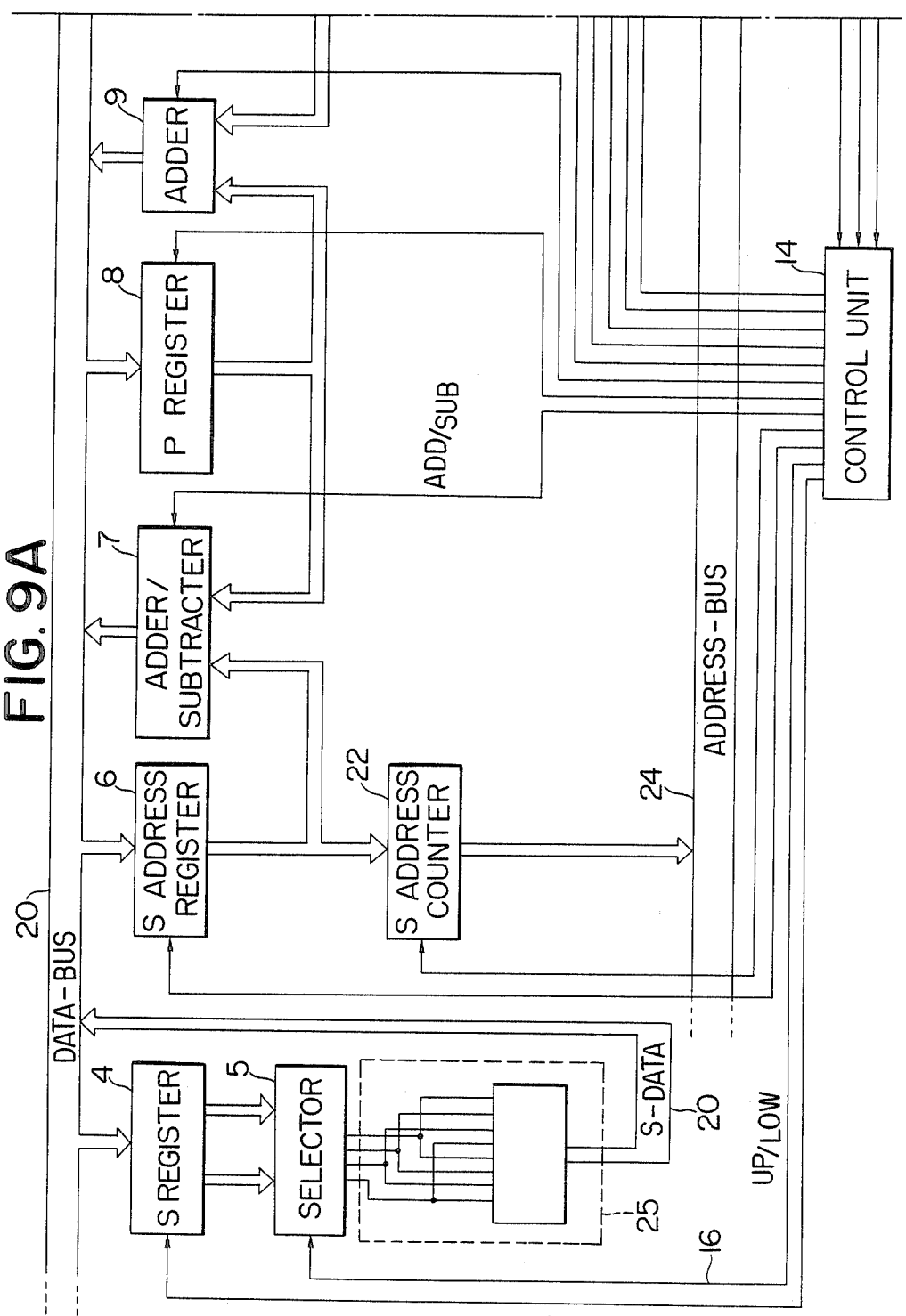

FIG. 9 shows a control circuit in the present embodiment. It enlarges a ditherred data in a rectangular area 2 starting from an address SADD in a memory 1 shown in FIG. 11 and transfers it to a rectangular area 3 enlarged by a factor of (2×2). Numeral 4 denotes an S-register for storing the data read from the rectangular area 2, numeral 5 denotes a selector for selectively outputting high order four bits or low order four bits of the content of the S-register 4 (having a bit width of eight bits), numeral 25 denotes an enlarger unit for enlarging the 4-bit output from the selector 5 to eight bits, numeral 20 denotes a data bus for transferring the image data or the address data from the memory 1 or the enlarger unit 25, numeral 6 denotes an S-address register for designating a start line address to read the square area 2, numeral 22 denotes an S-address counter for designating a memory access address of the square area 2 of the memory 1 based on the content of the S-address register 6, numeral 7 denotes an adder/subtractor, numeral 11 denotes an X register for indicating a horizontal length of the rectangular area 3, numeral 12 denotes an X counter for detecting the end of transmission of data for horizontal length of X, numeral 13 denotes a Y counter for detecting the end of data transfer for vertical length of Y, that is, the end of transfer of all data, numeral 8 denotes a P-register indicating one-line length of the memory 1, numeral 10 denotes a D-address register for designating a start line address for writing the rectangular area 3, numeral 23 denotes a D-address counter for designating a memory access address of the rectangular area 3, numeral 9 denotes an adder, numeral 24 denotes an address bus, and numeral 14 denotes a control unit for controlling the above counters and registers.

Figure 11:
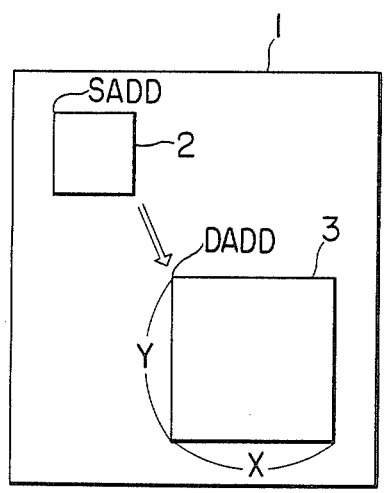
FIG. 11 shows a memory, FIG. 12 composed of FIGS. 12A, 12B and 12C shows a control flow chart for enlargement process in the present embodiment, and FIG. 13 composed of FIGS. 13A and 13B shows a control flow chart for reducing process in the present embodiment.

The ditherred image data (data in the rectangular area 2) in the memory space 1 shown in Fig. 11 is enlarged and transferred to the rectangular area 3.

Figure 12A:
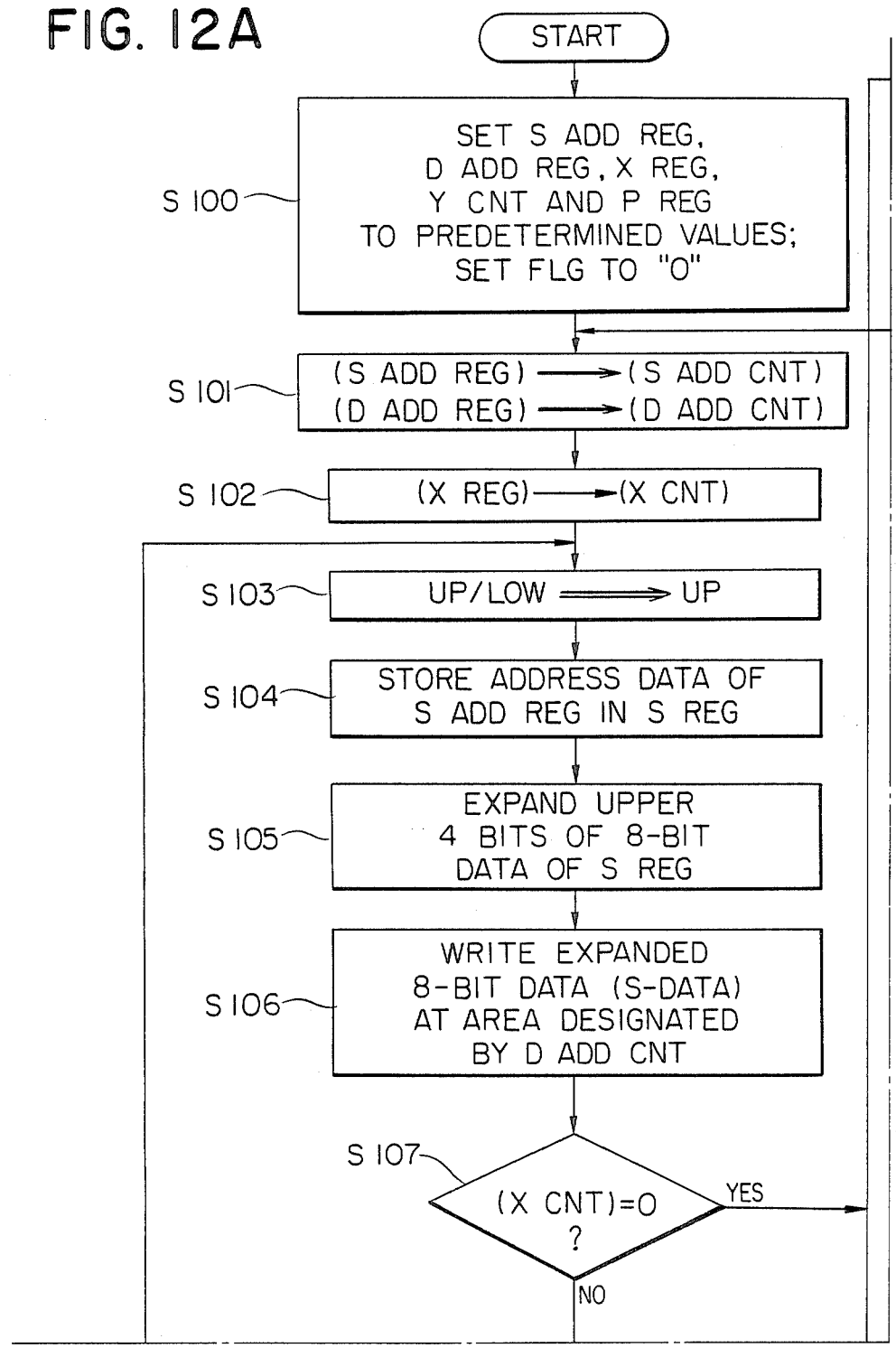
Figure 12B:
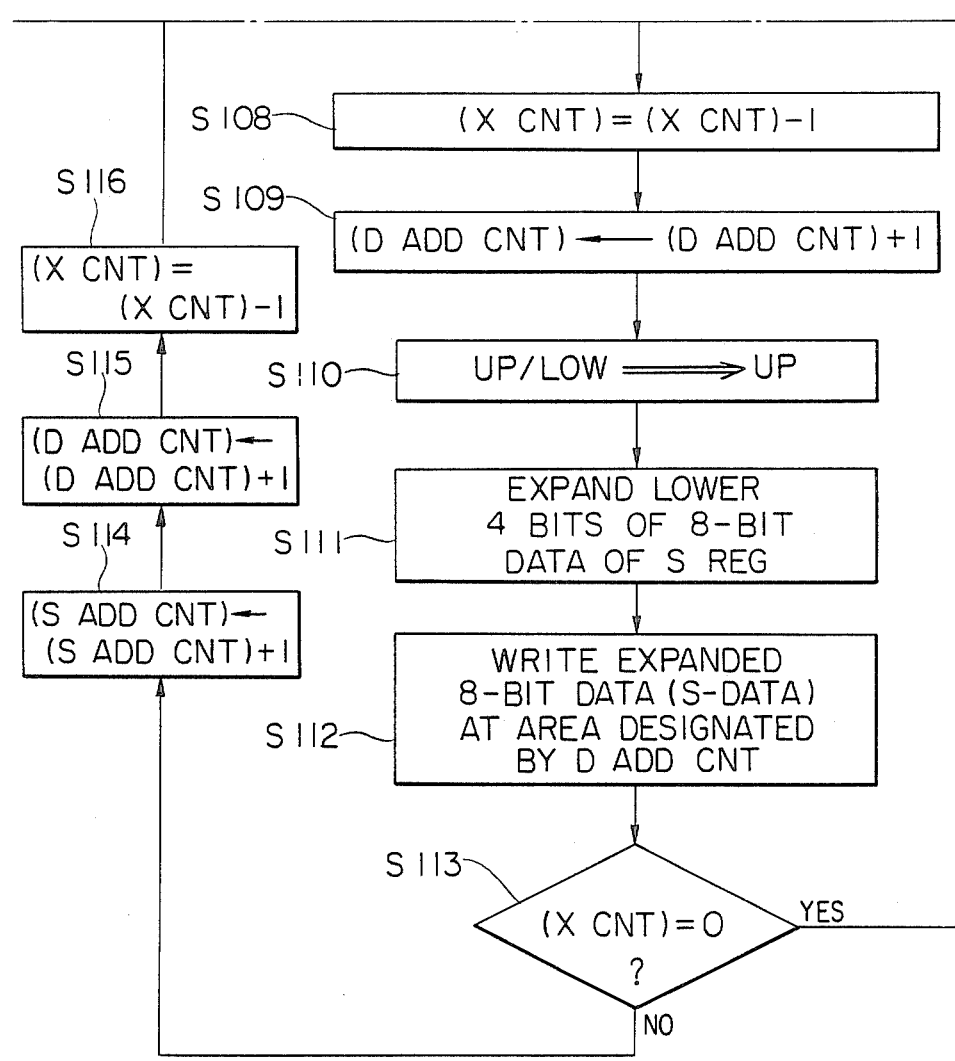
Figure 12:
Figure 12C:
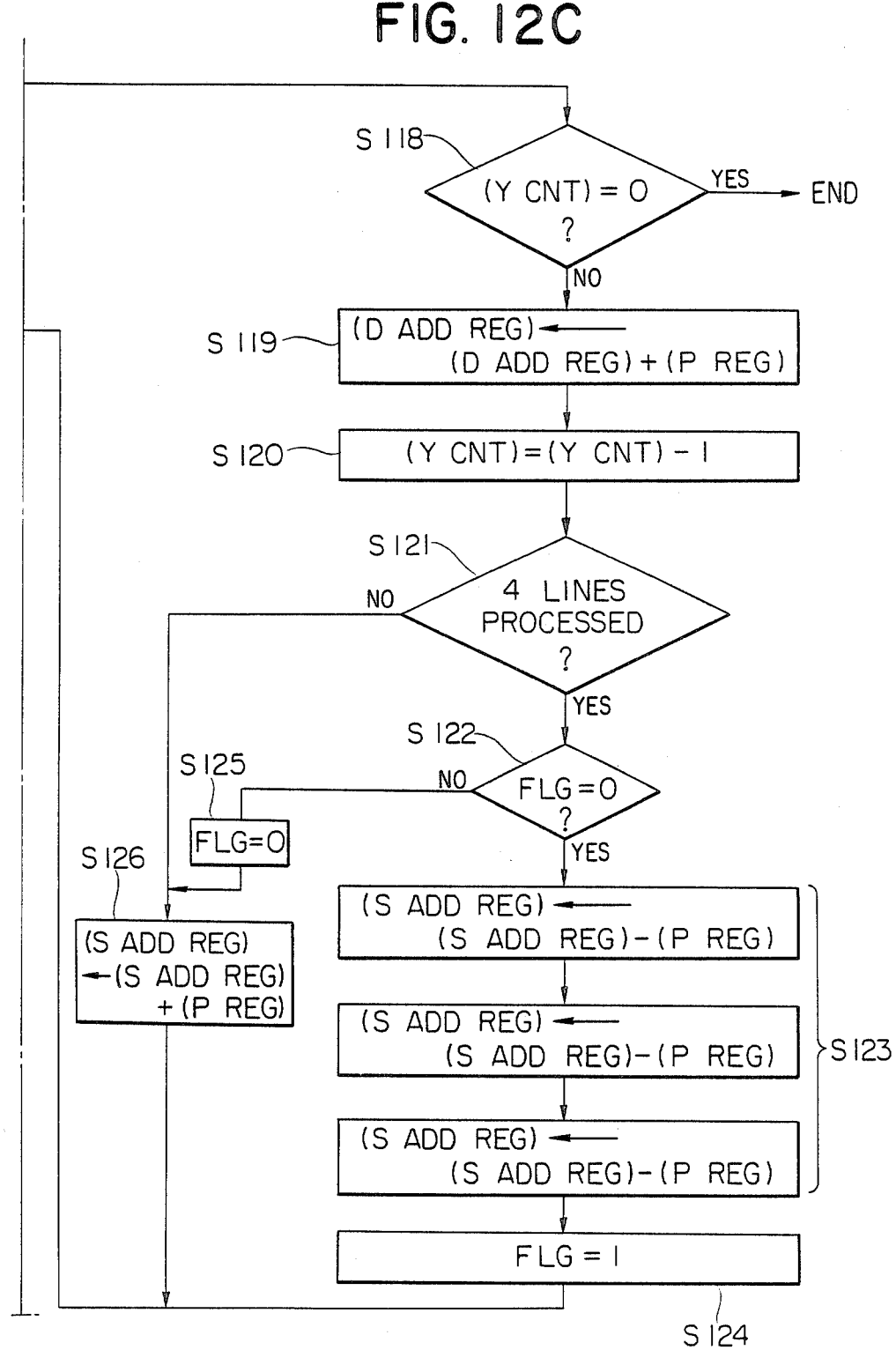

The enlarge processing is explained with reference to a flow chart shown in FIG. 12. In the present embodiment, a unit of processing is a 4×4 (bits) matrix and a unit of transfer is a byte (8 bits).

In a step 100, initial values are set in the registers and the counters and a flag FLG is set to "0". "SADD" which is the start address of the rectangular area 2 is set to the S-address register 6, "DADD" which is the start address of the rectangular area 3 is set to the D-address register 10, the horizontal length "X" of the rectangular area 3 is set to the X-register 11, the vertical length "Y" of the rectangular area 3 is set to the Y - counter 13, and the number corresponding to the horizontal length of the memory area of the memory 1 is set to the P-register. In a step 101, the contents of the S-address register 6 and the D-address register 10 are transferred to the S-address counter 22 and the D-address counter 23, respectively. In a step 102, the content of the X-register 11 is transferred to the X-counter 12. In a step 103, a control signal UP/LOW 16 to the selector 5 is set to UP. Thus, the selector 5 selects the high order four bits of the input eight bits from the S-register 4. In a step 104, the address in the S-address counter 22 is set to the S-register 4 through the data bus 20. In a step 105, the high order four bits of the eight-bit data stored in the S-register 4 is selected by the selector 5 and expanded to an 8-bit data (S-DATA) by the enlarge unit 25. The 8-bit data is two duplicates of the high order four-bit data. The expanded 8-bit data is written into the memory address designated by the D-address counter 23, in a step 106.

In a step 107, it is checked if one line of data (horizontal length of X) of the rectangular area 3 has been transferred and the X-counter 12 reached "0". If the X-counter 12 is "0", the program proceeds to a step 118, and if it is not "0", the program proceeds to a step 108 where the content of the X-counter 12 is counted down by the transfer and bit (one byte in the present example). In a step 109, the D-address counter 23 is counted up to advance the destination address by one byte.

In a step 110, the control signal UP/LOW 16 to the selector 5 is set to LOW. Thus, the selector 5 selects the low order four bits of the 8-bit data stored in the S-register 4. In a step 111, the low order 4-bit data is expanded to an 8-bit data by the enlarge unit 25 in the same manner as that in the step 105, and in a step 112 it is written into the address of the memory 1 designated by the D-address counter 23. In a step 113, it is checked if one line of data has been transferred in the same manner as that in the step 107. If the X-counter 12 is "0", the program proceeds to the step 118, and if it is not "0", the program proceeds to a step 114. In the step 114, since all of the 8-bit data stored in the S-register have been processed, the S-address counter 22 is counted up to advance the source address by one byte. In a step 115, the D-address counter 23 is counted up and in a step 116 the X-counter 12 is counted down. If the content of the X-counter 12 is "0"in the step 107 or 113, it is determined that the data of horizontal length of X has been transferred, and the program proceeds to the step 118. In the step 118, it is checked if the content of the Y-counter 13 is "0". If it is "0", all data should have been transferred and the data transfer/expansion process is terminated. If the data transfer has not been completed, the program proceeds to a step 119 where the content of the D-address register 10 and the content of the P-register are added together by the adder 9 and the sum is set to the D-address register 10. Thus, the start address of the next line of the rectangular area 3 is set in the D-address register 10. In a step 120, the content of the Y-counter 13 is counted down by one bit. In a step 121, it is checked if four vertical lines (four bits) have been processed, and if not, the program proceeds to a step 126 where the content of the S-address register 6 and the content of the P-register 8 are added together by the adder/subtractor 7 and the sum is set in the S-address register 6. Then, the program returns to the step 101. If the four lines have been processed in the step 121, the program proceeds to a step 122 where it is checked if the flag FLG is "0" or not. If it is not "0", it is set to "0" in a step 125. If it is "0", the program proceeds to a step 123 where the content of the P-register 8 is subtracted from the content of the S-address register 6 by the adder/subtractor 7 and the difference is set in the S-address register 6. In the step 123, the above operation is repeated three times. Thus, the source address reaches the start address which is three lines behind. In a step 124, the flag FLG is set to "1". By the above operation, the data in the rectangular area 2 is used twice for every four lines for the enlarge processing. In the present embodiment, the image is enlarged by a unit of 4×4-bit matrix.

Figure 10:
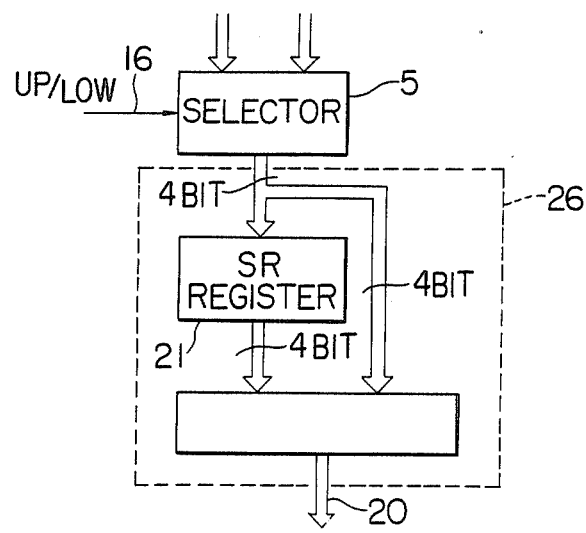
FIG. 10 shows a reducing unit.

The reduction process in the present embodiment is now explained. The control circuit for the reduction process can be readily achieved by replacing the enlarge unit 25 of the control circuit of FIG. 9 with a reduction unit 26 shown in FIG. 10. Thus, only the circuit shown in FIG. 10 is explained here and the explanation of other circuits is omitted. In the reduction circuit 26, an SR register 21 stores the high order 4-bit data from the selector 5.

The reduction process is explained in detail with reference to a flow chart shown in FIG. 13. Like in the enlarge process, the unit of reduction in the present embodiment is a 4×4 (bits) matrix and a unit of transfer is one byte. In the present embodiment, the data in the rectangular area 2 is reduced by a factor of ($\frac{1}{2} \times \frac{1}{2}$).

Initial values are set in the registers and the counters. "SADD" which is the start address of the rectangular area 2 is set in the S-address register, the address "DADD" is set in the D-address register 10, the horizontal length "X" of the rectangular area 3 is set in the X-register 11, the vertical length "Y" of the rectangular are 3 is set in the Y-counter 13, and the number corresponding to the horizontal length of the memory area of the memory 1 is set in the P register. In a step 201, the control signal UP/LOW 16 to the selector 5 is set to UP, because only the high order 4-bit data of the 8-bit transfer data is used in the reduction mode. In steps 202 and 203, the contents of the S-address register 6 and the D-address register 10 are transferred to the S-address counter 22 and the D-address counter 23, respectively. The content of the X register 11 is transferred to the X-counter 12. In a step 204, the content at the address designated by the S-address counter 22 is set in the S-register 4. In a step 205, the high order four bits of the 8-bit data set in the S-register 4 and selected by the selector 5 and stored in the SR register 21. In a step 206, the S address counter 22 is counted up, and in a step 207, the next one byte transfer data is set in the S-register 4. In a step 208, an 8-bit reduction data (S-DATA) is generated by the reduction unit 26 based on the 4-bit data stored in the SR register 21 and the high order 4-bit data of the S-register 4 selected by the selector 5. In a step 209, the 8-bit data is written into the memory address designated by the D-address counter 23. In a step 210, it is checked if one line of data (horizontal length of X) of the rectangular area 3 have been transferred and the X-counter 12 has reached "0".

If the X-counter 12 is "0", the program proceeds to a step 213, and if it is not "0", the program proceeds to a step 211. In the step 211, the X-counter 12 is counted down. In a step 212, the S-address counter 22 is counted up to advance the source address by one byte. The D-address counter 23 is also counted up and the program then proceeds to a step 204. In a step 213, it is checked if the content of the Y-counter 13 is "0". If it is "0", all data should have been transferred and the data transfer/reduction process is terminated. If the data transfer has not been completed, the program proceeds to a step 214 where the content of the D-address register 10 and the content of the P-register and added together by the adder 9 and the sum is set in the D-address register 10. In a step 215, the content of the Y-counter 13 is counted down by one bit.

In a step 216, it is checked if four vertical lines have been processed, and if not, the program proceeds to a step 218 where the content of the S-address register 6 and the content of the P-register 8 are added together by the adder/subtractor 7 and the sum is set in the S-address register 6. Then the program returns to the step 202.

If the four lines have been processed in the step 216, the program proceeds to a step 217 where the content of the S-address register 6 and the contents of the P-register 8 are added together by the adder/subtractor 7 and the sum is set in the 8-address register 6. In a step 217, this operation is repeated five times. Thus, the source address is changed to the start address which is five line ahead. Thus, when the four-line (four-bit) data has been transferred in the rectangular area 2, the following four lines are neglected and the data transfer is started from the fifth line. In this manner, the data in the rectangular area 2 is reduced by the unit of the 4×4-bit matrix.

With the arrangement described above, the ditherred image can be enlarged or reduced and data can be transferred to other memory area. The data can be processed in the same time as the data transfer time. Thus, the data transfer efficiency is much higher than that of the system in which the data is processed after the data transfer.

While the enlarge and reduction process of the image ditherred by the 4×4 dither matrix has been described, the image processed by the dither matrix of different size may also be enlarged or reduced. While the enlarge or reduction process is carried out by the unit of four bits in the present embodiment, the unit of processing may be changed depending on the size of the dither matrix. The magnification may also be set to any desired value. The image of any magnification can be produced by changing the hardware configuration of the enlarge circuit or the reduction circuit and changing the step 122, 125 or 217.

The control circuit for the enlarge and reduction process is not limited to the one shown in the embodiment but other circuit may be used.

In the present embodiment, the dithered image is enlarged or reduced. The present invention is also applicable to an image processed by a density pattern method.

In the present embodiment, the image data is transferred and processed in the memory 1. The present invention is also applicable to transfer the image data from a first memory to a second memory so long as they are connected to the same data bus.

The present invention is not limited to the illustrated embodiment but various modifications can be made within a scope of the appended claims.

What we claim is:

1. An image processing apparatus comprising:
   image data input means; and
   processing means for processing image data from said input means;
   said processing means changing the size of predetermined areas of the image data for each of said areas in accordance with an input magnification factor, said predetermined areas having a plurality of image data in conjunction with a half-tone processing operation.

2. An image processing apparatus according to claim 1 further comprising memory means for storing said image data, wherein said processing means magnifies the image data while transferring the image data from a first location to a second location in said memory means.

3. An image processing apparatus according to claim 2 wherein said processing means includes register means for storing addresses corresponding to said first and second locations.

4. An image processing apparatus according to claim 2 wherein said processing means includes register means for storing a value associated with a size of the magnified image.

5. An image processing apparatus according to claim 1 wherein said processing means enlarges the image data for each predetermined area having a plurality of image data associated with a half-tone process.

6. An image processing apparatus according to claim 1 wherein said processing means reduces the image data for each predetermined area having a plurality of image data associated with half-tone process.

7. An image processing apparatus according to claim 1 wherein said input image data is half-tone processed bit data.

8. An image processing apparatus comprising:
image data input means; and
processing means for processing image data from said input means, wherein the size of predetermined areas of said image data are changed and wherein said input image data is half-tone processed by a dither matrix, and said processing means changes the size of predetermined areas of said image data for each area associated with said dither matrix.

9. An image processing apparatus comprising:
image data input means; and
processing means for processing the image data from said input means while transferring said image data from a first location to a second location;
said processing means changes the size of said image data in association with a dither matrix when said image data is half-tone processed by said dither matrix.

10. An image processing apparatus according to claim 9 wherein said processing means changes the size of areas of said image data for each dither matrix.

11. An image processing apparatus according to claim 10 further comprising memory means for storing said image data, wherein said processing means magnifies the areas of image data while transferring the image data from said first location to said second location in said memory means.

12. An image processing apparatus according to claim 9 wherein said processing means includes register means for storing addresses corresponding to said first and second locations.

13. An image processing apparatus according to claim 9 wherein said processing means enlarges said areas of image data in association with said dither matrix.

14. An image processing apparatus according to claim 9 wherein said processing means reduces said areas of image data in association with said dither matrix.

15. An image processing apparatus according to claim 9 wherein said image data is bit data half-tone processed by said dither matrix.

* * * * *

UNITED STATES PATENT AND TRADEMARK OFFICE
CERTIFICATE OF CORRECTION

PATENT NO. : 4,734,786

DATED : March 29, 1988

INVENTOR(S) : TAKASHI MINAKAWA, ET AL.

It is certified that error appears in the above-identified patent and that said Letters Patent is hereby corrected as shown below:

AT [56] IN REFERENCES

Other Publications, "Transaction" should read --Transactions--.

IN THE DRAWINGS

Figure 13A:
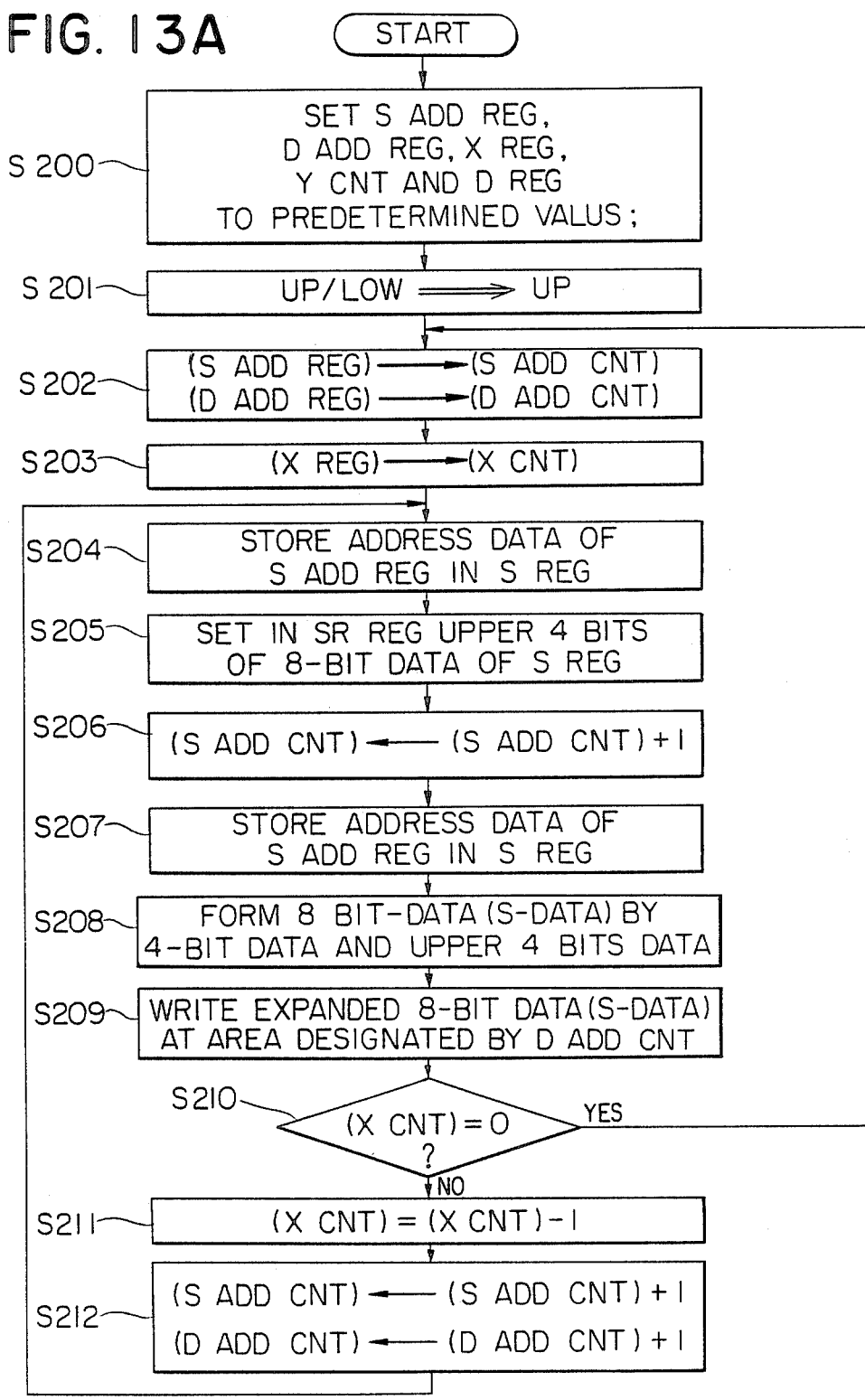
Figure 13B:
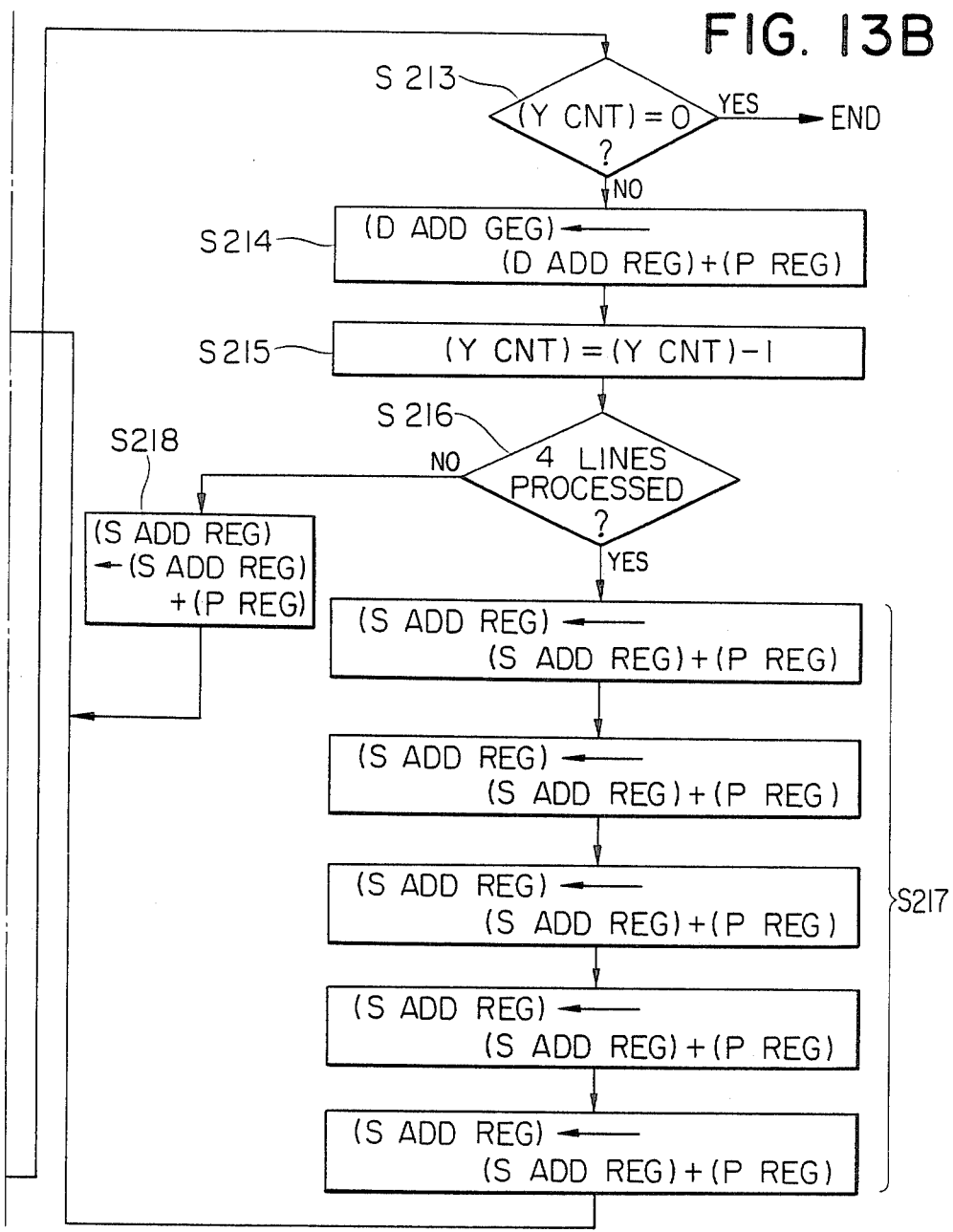
Figure 13:
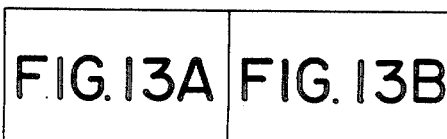

Sheet 9, Fig. 13A, In "S 200", "VALUS;" should read --VALUES;--.

COLUMN 1

Line 22, "ditherred" should read --dithered--.
Line 26, "ditherred" should read --dithered--.
Line 30, "ditherring" should read --dithering--.
Line 32, "ditherred" should read --dithered--.
Line 43, "other" should read --another--.
Line 46, "other" should read --another--.
Line 61, "ditherred" should read --dithered--.

COLUMN 3

Line 4, "ditherred" should read --dithered--.
Line 21, "adder/subtractor," should read --adder/subtracter,--.
Line 37, "ditherred" should read --dithered--.

UNITED STATES PATENT AND TRADEMARK OFFICE
CERTIFICATE OF CORRECTION

PATENT NO. : 4,734,786

DATED : March 29, 1988

INVENTOR(S) : TAKASHI MINAKAWA, ET AL.

It is certified that error appears in the above-identified patent and that said Letters Patent is hereby corrected as shown below:

COLUMN 4

Line 47, "adder/subtractor 7" should read
        --adder/subtracter 7--.
    Line 55, "der/subtractor 7" should read
        --der/subtracter 7--.

COLUMN 5

Line 13, "S-address register," should read --S-address
        register 6,--.
    Line 17, "are 3" should read --area 3--.
    Line 32, "S address" should read --S-address--.
    Line 55, "and added" should read --are added--.
    Line 63, "adder/subtractor 7" should read
        --adder/subtracter 7--.
    Line 68, "contents" should read --content--.

COLUMN 6

Line 1, "adder/subtractor 7" should read
        --adder/subtracter 7--.
    Line 2, "8-address register 6." should read --S-address
        register 6.--.
    Line 4, "line" should read --lines--.
    Line 10, "ditherred" should read --dithered--.
    Line 18, "ditherred" should read --dithered--.
    Line 32, "ditherred" should read --dithered--.

UNITED STATES PATENT AND TRADEMARK OFFICE
CERTIFICATE OF CORRECTION

PATENT NO. : 4,734,786
DATED : March 29, 1988
INVENTOR(S) : TAKASHI MINAKAWA, ET AL.

It is certified that error appears in the above-identified patent and that said Letters Patent is hereby corrected as shown below:

COLUMN 7

Line 8, "half-tone" should read --a half-tone--.

Signed and Sealed this

Eleventh Day of October, 1988

Attest:

DONALD J. QUIGG

Attesting Officer

Commissioner of Patents and Trademarks